US009069501B2

(12) United States Patent
Patruni et al.

(10) Patent No.: US 9,069,501 B2
(45) Date of Patent: Jun. 30, 2015

(54) MECHANISM THAT ALLOWS INITIATING PRINT WITHOUT BEING AWARE OF THE PRINTER EMAIL ADDRESS

(75) Inventors: Satish Kumar Patruni, Bangalore (IN); Nagaraj Sathyanarayana Saroday, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/407,292

(22) Filed: Feb. 28, 2012

(65) Prior Publication Data

US 2013/0222838 A1 Aug. 29, 2013

(51) Int. Cl.

| | |
|---|---|
| ***G06K 15/00*** | (2006.01) |
| *G06F 3/12* | (2006.01) |
| *G06F 3/00* | (2006.01) |
| *G06F 9/445* | (2006.01) |

(52) U.S. Cl.

CPC ............ *G06F 3/1222* (2013.01); *G06F 3/1238* (2013.01); *G06F 3/1267* (2013.01); *G06F 3/1292* (2013.01); *G06F 3/1287* (2013.01)

(58) Field of Classification Search

None

See application file for complete search history.

(56) References Cited

U.S. PATENT DOCUMENTS

| | | | |
|---|---|---|---|
| 5,090,231 | A | 2/1992 | Gallagher |
| 5,287,194 | A | 2/1994 | Lobiondo |
| 5,559,993 | A | 9/1996 | Elliott et al. |
| 5,832,191 | A | 11/1998 | Thorne |
| 5,862,471 | A | 1/1999 | Tiedemann et al. |
| 6,285,889 | B1 | 9/2001 | Nykanen |
| 6,335,795 | B1 | 1/2002 | Neuhard et al. |
| 6,337,745 | B1 | 1/2002 | Aiello, Jr. et al. |
| 6,359,642 | B1 | 3/2002 | Smith |
| 6,417,913 | B2 | 7/2002 | Tanaka |
| 6,516,157 | B1 | 2/2003 | Maruta et al. |
| 6,552,813 | B2 | 4/2003 | Yacoub |
| 6,560,621 | B2 | 5/2003 | Barile |
| 6,606,162 | B1 | 8/2003 | Simpson |
| 6,621,589 | B1 | 9/2003 | Al-Kazily et al. |
| 6,650,433 | B1 | 11/2003 | Keane et al. |
| 6,650,946 | B2 | 11/2003 | Bauer |
| 6,678,750 | B2 | 1/2004 | Tagg et al. |
| 6,748,471 | B1 | 6/2004 | Keeney |
| 6,751,732 | B2 | 6/2004 | Strobel et al. |
| 6,757,070 | B1 | 6/2004 | Lin et al. |

(Continued)

FOREIGN PATENT DOCUMENTS

| | | |
|---|---|---|
| CN | 101004668 A | 7/2007 |
| CN | 101237424 | 8/2008 |

(Continued)

OTHER PUBLICATIONS

"Weaving mobility into the fabric of the enterprise," WES 2009, HP and Blackberry Event Flyer, 2009, 1 page.

(Continued)

*Primary Examiner* — Fred Guillermety
*Assistant Examiner* — Henok A Shiferaw
(74) *Attorney, Agent, or Firm* — Conley Rose, P.C.

(57) ABSTRACT

In one implementation, a request for a print job for a printer having an email address is received. An identifier value for the requested print job is provided to a user. An identifier value input by the user is received. The user-input identifier value is verified, and the print job is released for printing based on the identifier value received from the user being successfully verified.

20 Claims, 5 Drawing Sheets

100
102
USER DEVICE
INPUT DEVICE
104
DISPLAY
106
CLOUD SERVICE
110
120
WEB-ENABLED PRINTER
INPUT DEVICE
DISP
122
123

(56) References Cited

U.S. PATENT DOCUMENTS 6,806,976 B1 10/2004 Suyehira
6,859,832 B1 2/2005 Gecht et al.
6,909,518 B2 6/2005 Miller et al.
6,978,299 B1 12/2005 Lodwick
6,993,562 B2 1/2006 Treptow et al.
6,996,611 B1 2/2006 Muto
7,019,861 B2 3/2006 Aagesen
7,051,095 B1 5/2006 Cantwell
7,064,856 B2 6/2006 Fu et al.
7,088,462 B2 8/2006 Bhogal et al.
7,096,265 B2 8/2006 Simpson et al.
7,106,470 B2 9/2006 Parry
7,113,300 B2 * 9/2006 Strobel et al. ................ 358/1.15
7,120,667 B2 10/2006 Derocher et al.
7,143,210 B2 11/2006 Ferlitsch
7,167,264 B2 1/2007 Takamiya
7,167,930 B2 1/2007 Reilly
7,184,159 B2 2/2007 Bergstrand
7,187,462 B2 3/2007 Oakeson et al.
7,191,327 B2 3/2007 Viljoen et al.
7,212,297 B2 5/2007 Liang et al.
7,218,411 B2 5/2007 Hohensee et al.
7,225,220 B2 5/2007 Gonzalez et al.
7,231,605 B1 6/2007 Ramakesavan
7,239,877 B2 7/2007 Corneille et al.
7,256,900 B1 8/2007 Hanaoka
7,265,867 B2 9/2007 Fu et al.
7,272,407 B2 9/2007 Strittmatter et al.
7,315,824 B2 1/2008 Chen et al.
7,352,485 B2 4/2008 Kinoshita
7,365,872 B2 4/2008 Lawrence et al.
7,441,003 B1 10/2008 Takeda et al.
7,576,883 B2 8/2009 Ragnet et al.
7,647,074 B2 1/2010 McCoog et al.
7,656,547 B2 2/2010 Kuo et al.
7,760,385 B2 7/2010 Yamaguchi
7,791,747 B2 9/2010 Roksz
7,800,768 B2 9/2010 Yamada
7,941,458 B2 5/2011 Torr
7,945,573 B1 5/2011 Barnes et al.
8,010,469 B2 8/2011 Kapoor et al.
8,027,049 B2 9/2011 Kinoshita et al.
8,045,485 B2 10/2011 Shima et al.
8,115,943 B2 2/2012 Ohishi
8,126,904 B1 2/2012 Bettinger et al.
8,179,549 B1 5/2012 Evans
8,223,355 B2 7/2012 McCoog et al.
8,253,956 B2 8/2012 Han
8,346,903 B2 1/2013 Shepherd
8,468,240 B2 6/2013 Prati
8,570,566 B2 10/2013 St. Laurent et al.
2001/0013053 A1 8/2001 Yamazaki
2001/0043357 A1 11/2001 Owa et al.
2002/0002592 A1 1/2002 Aoki et al.
2002/0013869 A1 1/2002 Taniguchi et al.
2002/0044299 A1 4/2002 Iwase et al.
2002/0051178 A1 5/2002 Nakayasu et al.
2002/0078160 A1 6/2002 Kemp et al.
2002/0083121 A1 6/2002 Chang et al.
2003/0002072 A1 1/2003 Berkema et al.
2003/0036350 A1 2/2003 Jonsson
2003/0053122 A1 3/2003 Kinoshita
2003/0078987 A1 4/2003 Serebrennikov
2003/0107762 A1 6/2003 Kinoshita et al.
2003/0115199 A1 6/2003 Ochiai
2003/0115458 A1 6/2003 Song
2003/0160997 A1 8/2003 Kimura
2003/0184557 A1 10/2003 Wen
2003/0227641 A1 12/2003 Edmonds et al.
2003/0231328 A1 12/2003 Chapin et al.
2004/0024787 A1 2/2004 Edwards et al.
2004/0039647 A1 2/2004 Roche et al.
2004/0100505 A1 5/2004 Cazier
2004/0125145 A1 7/2004 Sano et al.
2004/0125401 A1 7/2004 Earl et al.
2004/0130744 A1 7/2004 Wu et al.
2004/0137855 A1 7/2004 Wiley et al.
2004/0137928 A1 7/2004 Biundo
2004/0162804 A1 8/2004 Strittmatter et al.
2004/0176117 A1 9/2004 Strittmatter et al.
2004/0176118 A1 9/2004 Strittmatter et al.
2004/0203439 A1 10/2004 Zerressen
2004/0218201 A1 11/2004 Lermant et al.
2004/0218213 A1 11/2004 Shimizu et al.
2004/0230646 A1 11/2004 Clough et al.
2004/0252329 A1 12/2004 Sorenson
2004/0252332 A1 12/2004 McCoog et al.
2004/0253990 A1 12/2004 McCoog et al.
2005/0073522 A1 4/2005 Aholainen
2005/0088681 A1 4/2005 Hosoda
2005/0099639 A1 5/2005 Payne et al.
2005/0111856 A1 5/2005 Kawai
2005/0259287 A1 11/2005 Watanabe
2005/0270569 A1 12/2005 Hayashi
2006/0012828 A1 1/2006 Ohta
2006/0028681 A1 2/2006 Aagesen
2006/0044598 A1 3/2006 Etelapera
2006/0158681 A1 7/2006 Yorimoto et al.
2006/0258341 A1 11/2006 Miller et al.
2006/0259394 A1 11/2006 Cushing et al.
2007/0010915 A1 1/2007 Burson et al.
2007/0027990 A1 2/2007 Nakaoka et al.
2007/0030516 A1 2/2007 Tsuji et al.
2007/0050373 A1 3/2007 Ahmed et al.
2007/0088814 A1 4/2007 Torii
2007/0093265 A1 4/2007 Krykun
2007/0124436 A1 5/2007 Shepherd
2007/0127069 A1 6/2007 Steele et al.
2007/0195345 A1 8/2007 Martinez et al.
2007/0229879 A1 10/2007 Harmon et al.
2007/0229880 A1 10/2007 Harmon et al.
2007/0229891 A1 10/2007 Yanagi et al.
2007/0233834 A1 10/2007 Hattori et al.
2007/0297009 A1 12/2007 Kikuchi
2008/0004075 A1 1/2008 Horton
2008/0072254 A1 3/2008 Jung et al.
2008/0096486 A1 4/2008 Whitten
2008/0132252 A1 6/2008 Altman et al.
2008/0134316 A1 6/2008 Devonshire et al.
2008/0180712 A1 7/2008 Selvaraj
2008/0180726 A1 7/2008 Selvaraj
2008/0184162 A1 7/2008 Lindsey et al.
2008/0225326 A1 9/2008 Kephart et al.
2008/0239366 A1 10/2008 Cyman et al.
2008/0246988 A1 10/2008 Ashton
2009/0009802 A1 1/2009 Shaw et al.
2009/0033976 A1 2/2009 Ding
2009/0147299 A1 6/2009 Tetu
2009/0168100 A1 7/2009 Huster
2009/0174894 A1 7/2009 Kamijo
2009/0177381 A1 7/2009 Taniguchi et al.
2009/0216912 A1 8/2009 Lee et al.
2009/0257082 A1 10/2009 Kohli et al.
2009/0279126 A1 11/2009 Williams
2009/0287408 A1 11/2009 Gerdes et al.
2009/0287806 A1 11/2009 Hamilton et al.
2009/0296125 A1 12/2009 Kai
2009/0300226 A1 * 12/2009 Rubio ............................ 710/10
2009/0303523 A1 12/2009 Moross et al.
2010/0020349 A1 1/2010 Carroll
2010/0161832 A1 6/2010 Komine
2010/0169003 A1 7/2010 Van Der Meer
2010/0174698 A1 7/2010 Odland et al.
2010/0238493 A1 * 9/2010 Sako et al. .................. 358/1.15
2010/0277753 A1 11/2010 Shinchi
2010/0290073 A1 11/2010 Nuggehalli et al.
2010/0309508 A1 12/2010 Kamath
2010/0309510 A1 12/2010 Hansen
2011/0063668 A1 3/2011 Shirai
2011/0096354 A1 4/2011 Liu
2011/0145085 A1 6/2011 Khachatrian et al.
2011/0145930 A1 6/2011 Gnech et al.
2011/0196731 A1 8/2011 Christie et al.
2011/0202914 A1 * 8/2011 Kim et al. .................... 717/178

(56) References Cited

U.S. PATENT DOCUMENTS

| | | | |
|---|---|---|---|
| 2011/0242576 | A1 | 10/2011 | Allen et al. |
| 2011/0271197 | A1 | 11/2011 | Jones et al. |
| 2011/0276986 | A1 | 11/2011 | Kamath |
| 2011/0277027 | A1 | 11/2011 | Hayton et al. |
| 2012/0019864 | A1 | 1/2012 | Mickeleit et al. |
| 2012/0019867 | A1 | 1/2012 | Prati et al. |
| 2012/0026536 | A1 | 2/2012 | Shah |
| 2012/0038948 | A1 | 2/2012 | Park |
| 2012/0066374 | A1 | 3/2012 | Azzolin et al. |
| 2012/0069386 | A1 | 3/2012 | Krishnammagaru et al. |
| 2012/0140285 | A1 | 6/2012 | Kamath |
| 2012/0250074 | A1 | 10/2012 | Kamppari et al. |
| 2012/0262753 | A1 | 10/2012 | Viccari et al. |
| 2013/0038897 | A1 | 2/2013 | Heckler |
| 2013/0107312 | A1 | 5/2013 | Venkatesh |
| 2013/0321855 | A1 | 12/2013 | Bhatia |

FOREIGN PATENT DOCUMENTS

| | | | |
|---|---|---|---|
| CN | 100470513 | | 3/2009 |
| CN | 101520829 | A | 9/2009 |
| EP | 1107512 | | 6/2001 |
| EP | 1271300 | | 1/2003 |
| EP | 1450515 | A2 | 8/2004 |
| EP | 1646037 | A2 | 4/2006 |
| EP | 1937007 | A1 | 6/2008 |
| FR | 2907620 | A1 | 4/2008 |
| GB | 2360914 | | 10/2001 |
| JP | 2001197150 | | 7/2001 |
| JP | 2001344163 | | 12/2001 |
| JP | 2002112347 | | 4/2002 |
| JP | 2002245003 | A | 8/2002 |
| JP | 2002264431 | A | 9/2002 |
| JP | 2002290416 | A | 10/2002 |
| JP | 2002305521 | A | 10/2002 |
| JP | 2006277197 | A | 10/2006 |
| JP | 2007133817 | A | 5/2007 |
| KR | 20030042078 | A | 5/2003 |
| WO | WO-0041064 | A1 | 7/2000 |
| WO | WO-0174011 | | 10/2001 |
| WO | WO-2007112334 | A2 | 10/2007 |
| WO | WO-2008148576 | A1 | 12/2008 |
| WO | WO-2009120154 | | 10/2009 |
| WO | WO-2012112159 | A1 | 8/2012 |
| WO | WO-2012147089 | A1 | 11/2012 |
| WO | WO-2014003712 | A1 | 1/2014 |

OTHER PUBLICATIONS

"Xerox® Enterprise Print Services Connecting the Remote and Mobile Workforce," Sep. 2010, <http://www.xerox.com/downloads/usa/en/xgs/brochures/xgs_brochure_remote_mobile_workers_printing.pdf>.

Assigned Numbers—Bluetooth Baseband, Bluetooth Sig. Inc., 2003 www.bluetooth.org/foundry/assignnumb/document/baseband.

Blackberry Rocks! "HP and RIM Announce Strategic Alliance to Mobilize Business on Blackberry," Webpage, May 4, 2009, retrieved on Jun. 7, 2010, 4 pages.

Blecher, Joni; "Is HPs Cloud Print the future of printing on-the-go?" http://www.letstalk.com/blog/post.htm?blogId=989; May 6, 2009, 3 pages.

Bluetooth, "The Bluetooth System, Core, Version 1.0 B," Service Discovery Protocol SDP, Dec. 1, 1999, XP002176975, retrieved on Sep. 7, 2001, retrieved from the Internet: <www.bluetooth.com>.

Communication pursuant to Article 96(2) EPC issued in connection with European patent application No. 03022525, dated Dec. 16, 2004.

European Search Report issued in connection with European patent application No. 03022525, dated Jan. 29, 2004.

Garcia, Victor; "HP & RIM—Increasing the value of Enterprise Software for mobile employees," WES 2009 VG Breakout Session; May 3, 2009, 32 pages.

Hewlett-Packard Co., HP Jornada 520, 540 and 560 Series Pocket PC and HP Deskjet 995C—Printing with Bluetooth Using the Anycom, Inc. Bluetooth Card, On-line Customer Support Documents, 2001, www.hp.com/cposupport/printers/supp.

Hewlett-Packard Development Company, L.P, "HP Universal Print Driver," Apr. 2009, <http://www.governorsolutions.com/wp-content/uploads/2011/08/UPD-2009-DS-final1.pdf>.

Hewlett-Packard Deveiopment Company, L.P, "HP Universal Print Driver," Solution and Feature Guide, 2009, <http://h20331.www2.hp.com/Hpsub/downloads/UPD5_guide_final,%20web.pdf>.

Hewlett-Packard Development Company, L.P., "HP Driver and Queue Management Solutions," Mar. 2009, <http://h20195.www2.hp.com/v2/GetDocument.aspx?cc=us&doclang=EN_US&docname=4AA1-5596ENUC&doctype=brochure&lc=en&searchquery=&jumpid=reg_r1002_usen_c-001_title_r0002>.

Hewlett-Packard Development Company, L.P., "HP Universal Print Driver v5.7.0.16448," Release Notes, Sep. 17, 2013, <http://h10032.www1.hp.com/ctg/Manual/c03635717.pdf>.

Hewlett-Packard Development Company, L.P., "Service Administration Guide," HP Managed Printing Administration, edition 1, May 2006.

HP and BlackBerry;Weaving mobility into the fabric of the enterprises;WES2009 ~ May 6, 2009;1;Supplemental.

HP and RIM;Increasing the value of Enterprise Software for mobile ernployees;PowerPoint ~ May 6, 2009;1-32; Supplemental.

If It Prints, I'll Let You Know;Print Anywhere From Your BlackBerry Through HP CloudPrint; Website ~ Retrieved on Jun. 7, 2010;1-4; Supplemental.

International Search Report and Written Opinion received for PCT Application No. PCT/US2010/048790, Apr. 27, 2011, pp. 10.

International Search Report and Written Opinion received in PCT Application No. PCT/US2010/021442, Sep. 30, 2010, pp. 9.

LetsTalk.com/Phone Talk;Is HPs Cliud Print the future of printing on-the-go?;Website ~ May 6, 2009 ~ retrieved on Jun. 7, 2010;1-3;Supplemental.

Mauricio, "HP and RIM Announce Strategic Alliance to Mobilize Business on BlackBerry," http://blackberryrocks.com/2009/05/04/hp-rim-announce-strategic-alliance-mobilize-business-blackberry/, 2009, 4 pages.

McLaughlin, L. "Line Printer Daemon Protocol," Network Printing Working Group, Aug. 1990, pp. 1-12.

Microsoft Corp., "To search for a printer," Jan. 6, 2008, <http://web.archive.org/web/20080106161518/http://www.microsoft.com/resources/documentation/windows/xp/all/proddocs/en-us/print_find_printers.mspx?mfr=true>.

Microsoft TechNet, "How Network Printing Works," Microsoft Corporation, Mar. 28, 2003, pp. 1-11.

Pfeifle et al., "CUPS Printing Support," Samba, Part III, Chapter 22, Jan. 27, 2004, <http://www.samba.org/samba/docs/man/Samba-HOWTO-Collection/CUPS-printing.html>

Service Discovery Application Profile, Feb. 22, 2001, pp. 64-98, Bluetooth Specification Version 1.1.

Suffield, David, "HPLIP 2008 State of Affair," Apr. 2008, <http://www.linuxfoundation.org/images/6/6d/Hplip_2008.pdf>, 6 pages.

Thomas, Taylor, "Online Printing Services Review," Mimeo, available online Aug. 21, 2009, <http://web.archive.org/web/20090821133549/http://online-printing-services-review.toptenreviews.com/mimeo-review.html>.

USPTO, Office Action issued in relation to U.S. Appl. No. 12/881,975, dated Aug. 21, 2012.

Yang, et al., "Offer with Choices and Accept with Delay: A Win-Win Strategy Model for Agent Based Automated Negotiation," ICIS 2009 Proceedings; 20 pag.

Yinping, et al.; Designing an IntellectuaI Agent that Negotiates Tactfully with Human Counterparts: A conceptual Analysis and Modeling Framework; 42nd Hawaii ICSS—2009; 10 pgs.

Develop, "Develop joins Cloud Printing Alliance," (Research Paper), Jun. 26, 2012, available at http://www.develop.de/en/0/143_news-detail.htm.

Equitrac, "Rules & Routing," (Brochure), 2010, retrieved from the intemet at: http://www.equitrac.com/downloads/5379-Rules-Routing_7-10.pdf.

(56) References Cited

OTHER PUBLICATIONS

Experts Exchange, “Setting up multiple printers using same IP address with different ports,” Apr. 29, 2010, 3 pages, retrieved at: http://www.experts-exchange.com/OS/Microsoft__Operating__Systems/Server/2003__Server/Q__26107790.htm.

Fernandes, L. et al., “The mobile print enterprise,” (Research Paper), Jan. 2012, 9 pages, available at http://www.quocirca,com/media/reports/012012/653/The%20mobile%20print%20enterprise%20Public%20Excerpt%20Jan%202012.pdf.

Grayson, Wayne; “Google Announces Web App for Printing from Mobile Device”, < http://grayson.blogs.tuscaloosanews.com/11308/google-announces-web-app-for-printing-from-mobile-device/ >; Apr. 16, 2010.

Hewlett-Packard Development Company, L.P., “Cloud printing in the enterprise: Liberating the mobile print experience from cables, operating systems and physical boundaries,” Mar. 2010, <http://www.hubtechnical.com/Collateral/Documents/English-US/HP/11-CloudPrintingintheEnterprise.pdf>.

Hewlett-Packard Development Company, L.P., “HP Access Control Secure Pull Printing,” Nov. 2008, <http://h71028.www7.hp.com/enterprise/downloads/HP-Access-Control-Secure-Pull-Printing.pdf>.

Hewlett-Packard Development Company, L.P., “HP ePrint Enterprise mobile printing solution,” Mar. 2010, <http://www.hp.com/hpinfo/newsroom/press__kits/2010/MPSSpring2010/pdf/HP__ePrint.pdf>.

Hewlett-Packard Development Company, L.P., “HP ePrint Enterprise mobile printing.solution,” Sep. 2010, <http://www.hp.com/hpinfo/newsroom/press__kits/2010/InnovationSummit/HP__ePrint__Enterprise__Solution.pdf>.

Hewlett-Packard Development Company, L.P., “Print Where Business Happens,” (Brochure), Jul. 5, 2012, 2 pages.

International Preliminary Report on Patentability received in PCT Application No. PCT/US2010/021442, Aug. 2, 2012, 6 pages.

International Preliminary Report on Patentability received in PCT Application No. PCT/US2010/048790, Aug. 23, 2012, 7 pages.

International Preliminary Report on Patentability received in PCT Application No. PCT/US2012/044098, Jan. 8, 2015, 6 pages.

International Search Report & Written Opinion received in PCT Application No. PCT/US2012/044098, Feb. 20, 2013, 9 pages.

Printech, “Intelligent Print Job Routing,” 2009, 1 page, retrieved at: http://www.printech.com/intelligent__print__job__routing.htm.

Ricoh, “doc-Q-manager, The Enterprise-wide Network Solution for Effective Print Job Management,” Printing Solutions for Aficio Series, Oct. 3, 2006, available at http://www.ricoh-photocopiers.co.uk/Print__Management/DocQManagerBro.pdf.

Wolber, A., “Print Anywhere: Chrome, Googie Apps and Cloud Print,” (Web Page), Oct. 9, 2012, 10 pages, available at http://www.techrepublic.com/blog/google-in-the-enterprise/print-anywhere-chrome-google-apps-and-cloud-print/.

Xerox, “Xerox® Mobile Print,” (Web Page), 2013, 2 pages., available at http://www.office.xerox.com/software-solutions/xerox-mobile-print-solution/enus.html.

* cited by examiner

MECHANISM THAT ALLOWS INITIATING PRINT WITHOUT BEING AWARE OF THE PRINTER EMAIL ADDRESS

BACKGROUND

A web-enabled printer is a printer that has internet connectivity. A web-enabled printer has an associated email address. A user of a computing device such as a smart phone can email a document to the web-enabled printer, and the printer will print the emailed document.

Printing to a web-enabled printer requires knowledge of the email address associated with the printer. Knowledge of the printer's email address is fine if, for example, the printer belongs to the person desiring to use the printer. However, in some situations, the person using the computing device to initiate the print job is different than the person that owns the web-enabled printer the former person desires to use.

For example, a person may be in a hotel lobby in which a web-enabled printer is located. For that person to email a document to the printer, the hotel management would need to tell the person the email address of the hotel's web-enabled printer. And once the printer's email address becomes known, the hotel management may find it difficult to control the use of the hotel's printer.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
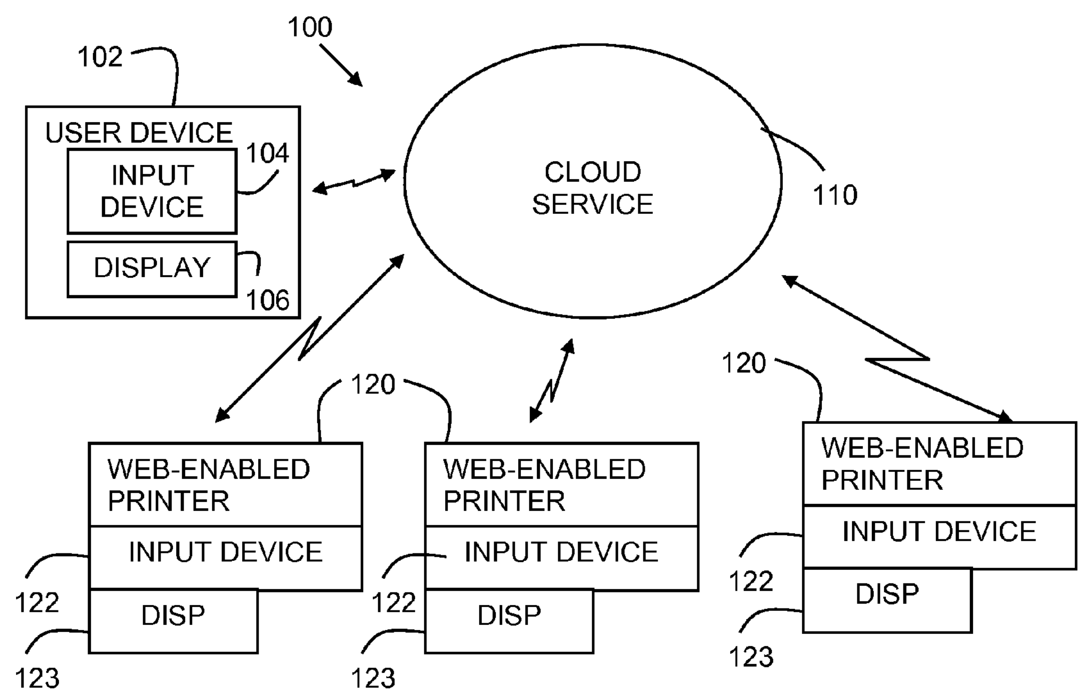
FIG. 1 shows a system in accordance with various examples.

FIG. 1 illustrates a system 100 in accordance with various examples. System 100 includes a user device 102 that is able to communicate through a cloud service 110 to a web-enabled printer 120. Although one user device 102 is shown in FIG. 1, the system 100 works with any number of user devices 102. The user device 102 uses the cloud service 110 to select a web-enabled printer and send a print job to the selected web-enabled printer. The user initially registers him or herself in order to use the cloud service. Part of the registration process is for a user name to be assigned to or otherwise selected by the user. By way of example, the user name may be the user's email address. As explained below, the a user of the user device 102 selects a web-enabled printer 120 and initiates a print job to that printer without knowledge of the selected printer's email address.

The user device 102 can be any type of computing device. Examples include smart phones and notebook computers. The user device 102 includes an input device 104 (e.g., a keypad, keyboard, etc.) and a display 106. In some embodiments, the input device 104 and display 106 are implemented in the form of a touchscreen.

Each web-enabled printer 120 comprises a printer that can connect directly to the Internet or other type of network. Each printer 120 includes an input device 122 such as a keypad as well a display 123. A unique email address is associated with each web-enabled printer 120. If the user of a user device 102 knew the email address of a particular web-enabled printer, the user could email a document stored or otherwise accessible to the user device 102 to the email address of a printer. The target web-enabled printer 120 will receive the email and print the document. However, in accordance with various embodiments, the user of the user device 102 is not informed of the email address of the web-enabled printers. Each web-enabled printer 120 is registered with the cloud service 110. Part of the registration process involves providing the physical location (e.g., postal address, longitude and latitude, etc.) of the printer.

Figure 2:
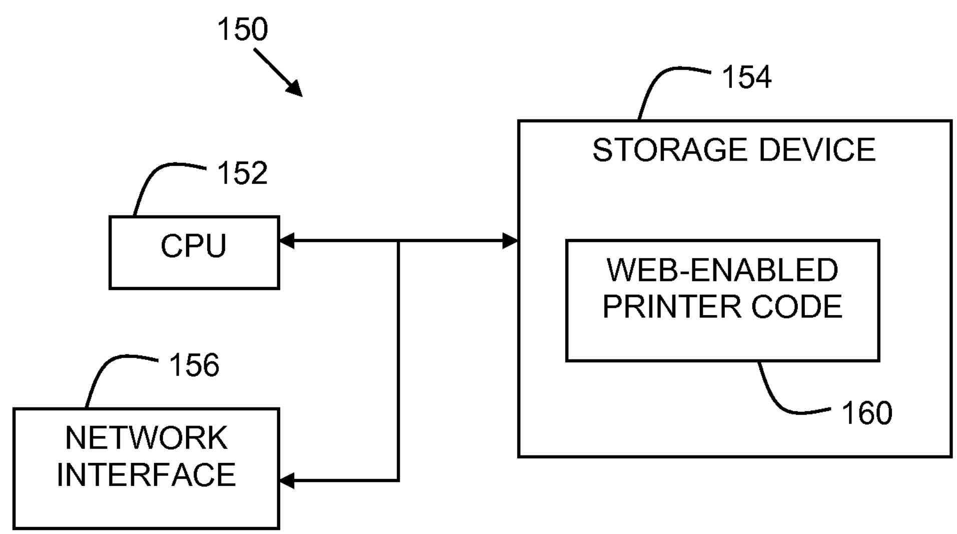
FIG. 2 shows a system implementing a user device or server in accordance with various examples.

The cloud service 110 is implemented on, for example, a computing system such as a server with which the user device 102 and the web-enabled printers 120 communicate. FIG. 2 illustrates an example of such a computing system. Computing system 150 in FIG. 2 includes a central processing unit (CPU) 152 coupled to a non-transitory storage device 154 and a network interface 156. The storage device 154 may be implemented as any form of non-transitory storage media such as random access memory (RAM), a hard disk drive, Flash storage, or combinations thereof. The storage device 154 includes web-enabled printer code 160, which comprises machine readable instructions that are executed by the CPU 152 to impart the computing system 150 with some or all of the functionality described herein. The hardware diagram of FIG. 2 may also apply to the architecture of the user device 102.

In accordance with various embodiments, when a user of the user device 102 wants to send a print job to a web-enabled printer 120, the user first selects a printer to receive the print job. In some embodiments, the user device 102 includes satellite-based positioning receiver such as a Global Positioning System (GPS) receiver. That receiver provides an indication as to the physical location (e.g., coordinates) of the user device. In other embodiments, the user may input into the user device the location (e.g., postal address). The user's user device 102 provides its location to the cloud service 110. The locations of the various web-enabled printers 120 have previously been provided to the cloud service 110 via the aforementioned registration process. The cloud service 110 performs a printer discovery process by which the cloud service identifies which printers 120 are close to the user's user device. The distance from the user device 102 that the cloud service will search for printers 120 may be programmable or fixed at given distance (e.g., 100 feet). The cloud service 110 provides information to the user device 102 as to which printers 120 are nearby the user device. Such information may be provided in the form of a list of printer names or in the form of map data showing the location of the user device 102 as well as the location of printers 120 present on the map data given the resolution chosen by the user of the user device 102. In accordance with various embodiments, the cloud service 110 does not provide the email address of the discovered web-enabled printers 120 to the user device. The cloud service 110 generates and provides a URL. This URL is provided to the user device 102 along with the list of printers. Providing this URL eliminates the need for user device 102 to know the printers' email address.

The user of the user device 102 then selects one of the web-enabled printers identified by the cloud service 110 to receive a print job from the user device. The cloud service 110 transmits the print job (e.g., document) to the web-enabled printer selected by the user via the URL generated by the cloud service 110. The URL generated by the cloud service 110 may include a universally unique identifier (UUID) that the cloud service 110 maps to, or otherwise associates with, the web-enabled printer selected by the user of the user device 102. The unique URL (unique due, for example, to the UUID included in the URL) points to a representational state transfer application programming interface (REST API). The REST API is a programmatic interface to which clients such as user devices 102 can connect to programmatically initiate a print job. When initiating a print job, the user device 102 will connect to the URL provided by the cloud service 110. The user device may provide additional information on how the print should appear on paper.

The cloud service 110 also generates an identifier value for the print job. The identifier value may be, or may be based on, a random number. The identifier value may be universally unique, but in other implementations the same identifier value may be used more than once on different print jobs. The identifier value is different than the UUID included in the URL. The identifier value comprises an alphanumeric character string in some examples. The identifier value may be a personal identifier (PIN). The cloud service 110 transmits the identifier value to the user device 102 which displays the identifier value on the display 106 for the user to see.

The cloud service 110 further inserts the print job to a print queue corresponding to the selected printer 120. The term print queue refers to any type of storage paradigm for a print job such as a print box or other type of data structure. The cloud service maintains such a queue for each web connected printer. The print job is held in queue by the cloud service for a configurable time duration (e.g., 24 hours) to be sent to the printer after the correct identifier value is provided. The print queue can be viewed on the display 123 of the selected printer 120.

Having knowledge of the identifier value, the user approaches the targeted printer, views the print queue/print box on the display 123 of the printer 122. The user selects the print job in the queue and inputs the identifier value the user received into the input device 122 of the printer. Access to the printer may be controlled by a person other than the user of the user device. For example, the printer may be owned by the owner of the business in which the user is attempting to print a document. The user of the user device 102 may not be permitted to input the identifier value until the business' representative (e.g., store or hotel clerk) says so. The business' representative may require payment for the printing service from the user before permitting the user to enter the identifier value. The identifier value can be entered directly into the printer's input device 122 or an input device otherwise coupled to or accessible by the printer 120.

Once the user does enter the identifier value, which should match the identifier value generated by the cloud service, the printer 120 transmit the user-entered identifier value to the cloud service 110 which verifies the user-entered identifier value. This verification process may include the cloud service 110 comparing the user-entered identifier value provided to the cloud service by the printer with the identifier value originally generated by the cloud service for that particular print job.

If the two identifier values match, the user-entered identifier value is determined by the cloud service 110 to be successfully verified. If the identifier values do not match, the user-entered identifier value is determined by the cloud service 110 not to be successfully verified. If the user-entered identifier value is successfully verified, the cloud service 110 releases the print job and the job data is sent to the web-enabled printer 120. Releasing the print job means that the printer 120 will actively begin to print the print job initiated by the user of the user device. If, however, the user-entered identifier value is not successfully verified, the cloud service 110 will not release the job and the job will continue to be held by the cloud service 110 and not printed. When a job is not successfully released from the server, after the threshold period of time noted above (e.g., 24 hours), the cloud service 110 will purge from the queue the job information and the document received as part of the print job.

Figure 3:
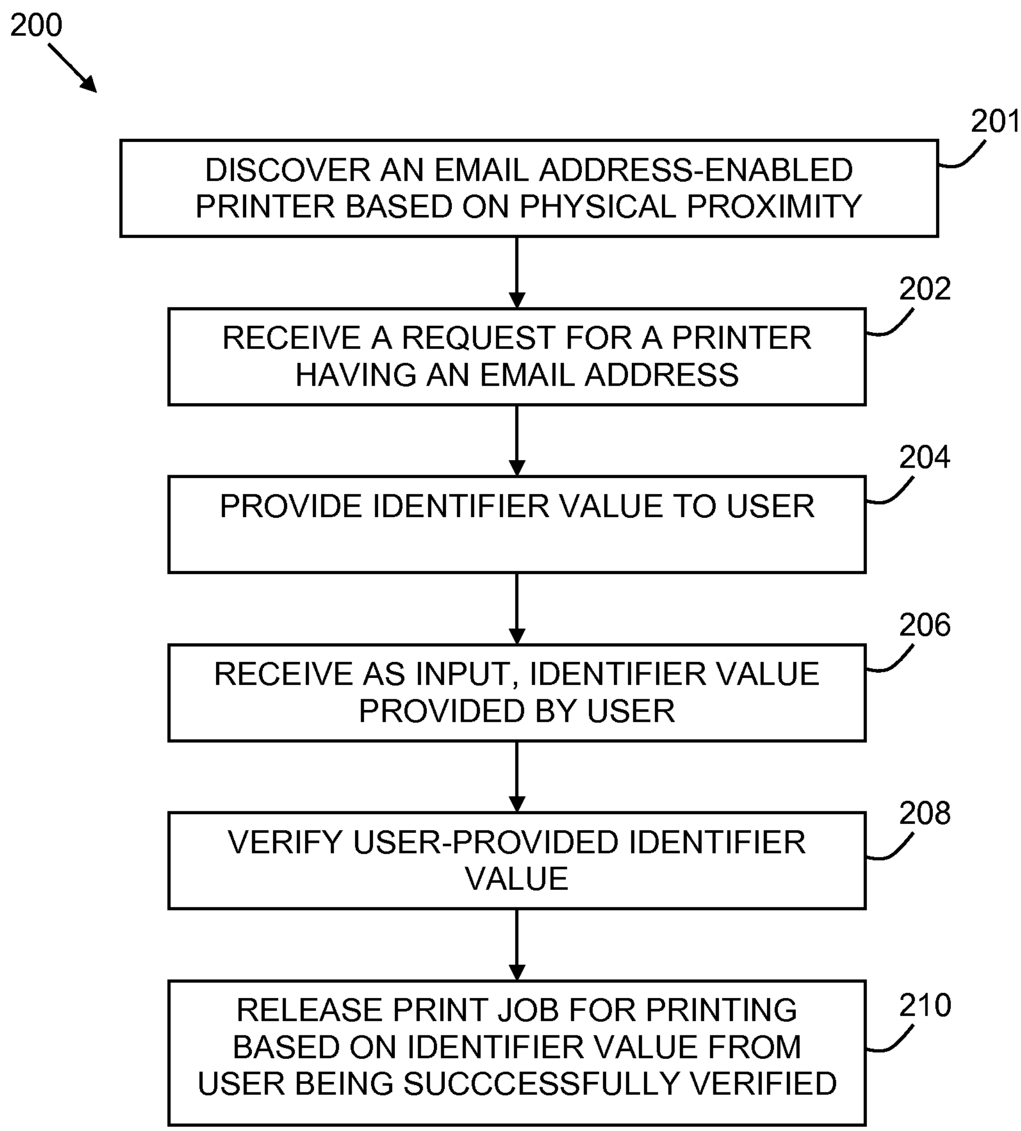
FIG. 3 shows a method in accordance with various examples.
Figure 4:
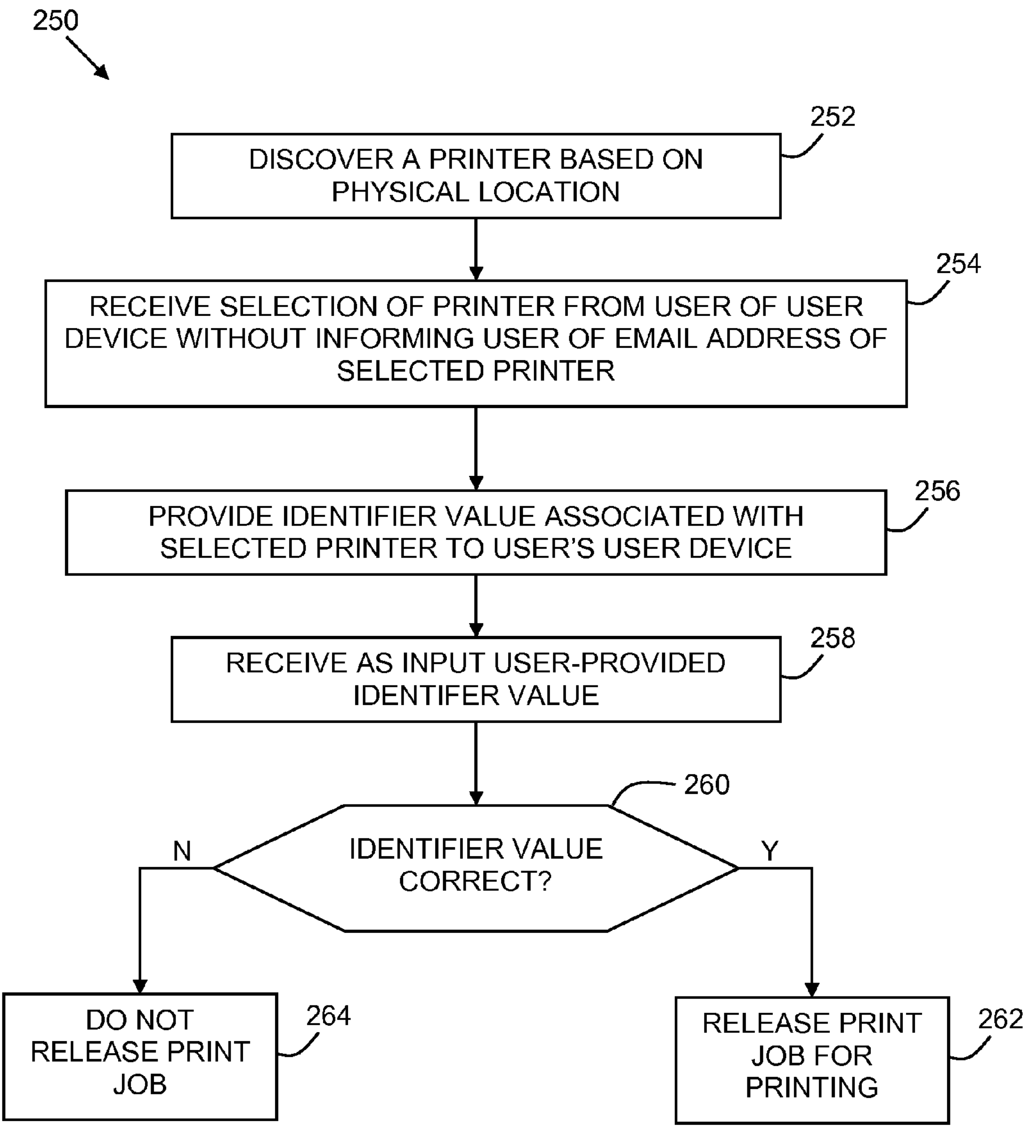
FIG. 4 shows a method in accordance with various examples.
Figure 5:
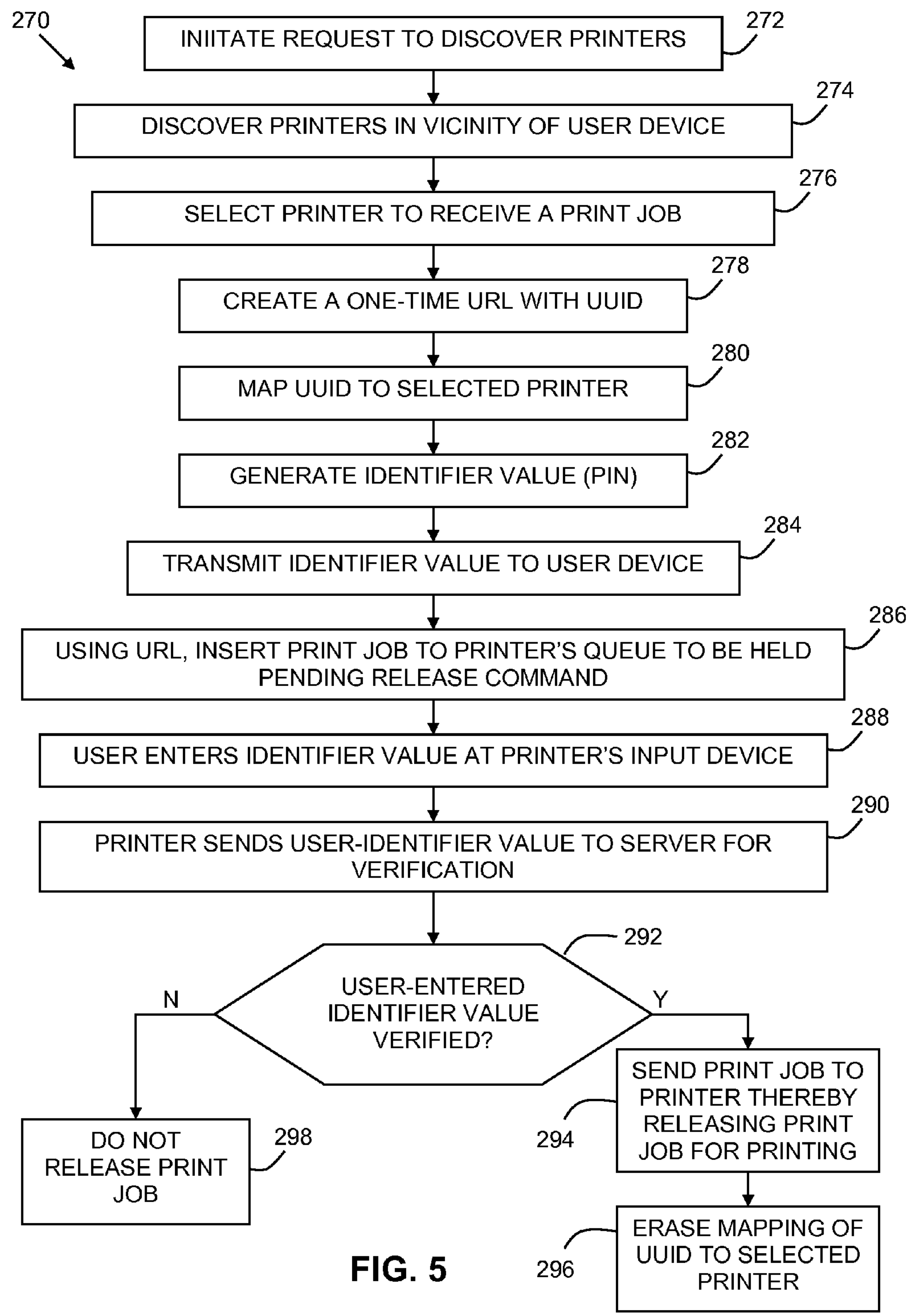
FIG. 5 shows a method in accordance with various examples.

FIGS. 3-5 show various methods in accordance with various embodiments. FIG. 3 illustrates a method 200. The various actions shown in FIG. 3 can be performed in the order shown, or in a different order. Further, two or more of the actions may be performed in parallel rather than serially. Reference is made below to a "server." The server referenced is the server 150 that implements the functionality of the cloud service 110 described above.

At 201, method 200 includes the server discovering one or more web-enabled printers based on physical proximity of such printers to a user device 102 (e.g., a user device 102 through which a user is attempting to initiate a print job). At 202, method 200 includes the server 150 receives a request for a printer having an email address to print a requested print job. The request may originate from the user device 102. At 204, the server provides an identifier value to a user of the user device 102 that originated the request. At 206, the server 150 receives as input an identifier value provided by a user. From potentially multiple print jobs, the user selects his or her desired job on the printer's display 123 and, when prompted by the printer, provides the identifier value into the input device of the printer targeted by the print job as explained above. Each print job may be identified on the printer's display using the user names associated with each user (e.g., user's email address as explained above). At 208, the server 150 verifies the user-provided identifier value. At 210, the server 150 causes the print job to be released based on the user-provided identifier value being successfully verified.

FIG. 4 shows a method 250. The various actions shown in FIG. 4 can be performed in the order shown, or in a different order. Further, two or more of the actions may be performed in parallel rather than serially. Reference is made below to a "server." The server referenced is the server 150 that implements the functionality of the cloud service 110 described above.

At 252, the server 150 discovers a web-enabled printer 120 based on physical location. As explained above, the server 150 has the physical location of the registered printers 120. When a user desired to initiate a print job to a web-enabled printer, the server 150 receives information specifying the physical location of the user's user device 102. The server 150 then determines which printers 120 are in the vicinity of the user device, and provides a list of nearby printers to the user device.

At 254, the server 150 receives a selection of a printer from the user of the user device without having informed the user of the email address of the selected printer. At 256, the server 150 provides an identifier value associated with the selected printer to the user's user device 102. At 258, the server 150 receives as input an identifier value provided by a user after the use selects the print job on the printer's display as explained above. The user provides the identifier value into the input device of the printer targeted by the print job as explained above.

At 260, the server 150 determines whether the user-provided identifier value is correct for the selected print job. If the user-provided identifier value is correct, then at 262, the server causes a print job to be released to the targeted printer. If the user-provided identifier value is not correct, then at 264, the print job is not released and the print job therefore is not printed.

FIG. 5 shows a method 270. The various actions shown in FIG. 5 can be performed in the order shown, or in a different order. Further, two or more of the actions may be performed in parallel rather than serially. Reference is made below to a "server." The server referenced is the server 150 that implements the functionality of the cloud service 110 described above.

At 272, the user of a user device 102 initiates a request to discover nearby web-enabled printers to initiate a print job. This action can be performed by the user running an application on the user device 102 to access the cloud service 110.

At 274, the server 150 discovers web-enabled printers 120 in the vicinity of the user's user device 102. As explained above, the server 150 previously is provided with the physical location of the registered printers 120. When a user desired to initiate a print job to a web-enabled printer, the server 150 receives information specifying the physical location of the user's user device 102. The server 150 then determines which printers 120 are in the vicinity of the user device, and provides a list of nearby printers to the user device. At 276, the user of the user device selects a particular printer 120 form the set of printers provided by the server 150.

At 278, the server 250 generates a one-time use URL with a UUID, and maps the UUID to the printer 120 selected by the user (280). Mapping the UID to the printer may entail the server storing information in a database to associate the UUID to the printer. The server 150 also generates an identifier value (e.g., PIN) at 282 and at 284 transmits the identifier value to the user's user device for the user to see.

At 286, the server receives the print job from the user device 102 at the URL created at 278 and inserts the job to print queue of the printer. The job will held on the server pending receipt by the printer of a release command from the server. After the user selects the print job on the printer's display 123 as described previously, the user enters (288) the identifier value provided to the user at 284 into the printer's input device 122. At 290, the printer sends the user-entered identifier value to the sever 150 for verification. The user-entered identifier value is verified by the server at 292 by, for example, comparison with the identifier value generated by the server at 282. If the identifier value is successfully verified, then at 294, the server 150 sends the print job data to the selected printer, and at 296, the server erases the mapping of the UUID to the selected printer preventing additional access to the printer through that UUID. If, however, the identifier value is not successfully verified, then the print job is not released as indicated at 298.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:

a storage device containing machine-readable instructions; and a central processing unit (CPU) coupled to said storage device and to execute the machine-readable instructions to:

discover a web-enabled printer based on physical proximity of the printer to a user device, and after discovery of the printer based on physical proximity of the printer to the user device, perform each of:

receive, from a user of the user device, selection of the printer for a print job, generate a one-time use uniform resource locator (URL) for the print job, provide an identifier value for the print job to the user device, using the one-time use URL, transmit the print job to a print queue of the selected printer, receive as input the identifier value input by the user, verify the user-input identifier value, and release the print job for printing based on the identifier value received from the user being successfully verified.

2. The system of claim 1 wherein the CPU executes the machine-readable instructions to generate the identifier value based on receiving a request for the print job.

3. The system of claim 1 wherein the identifier value is used only once.

4. The system of claim 1 wherein the CPU executes the machine-readable instructions to:

transmit a list of discovered printers to the user device, and receive, from the user of the user device, selection of the printer from the list of discovered printers.

5. The system of claim 1 wherein the CPU executes the machine-readable instructions to receive a request from the user to discover a web-enabled printer for the print job.

6. The system of claim 1 wherein the CPU executes the machine-readable instructions to:

generate the one-time use URL with a universally unique identifier (UUID), map the UUID to the printer selected by the user, and erase the mapping of the UUID to the selected printer upon release of the print job for printing.

7. The system of claim 1 wherein physical proximity is based on a satellite-based positioning receiver associated with the user device.

8. The system of claim 1 wherein physical proximity is based on a location provided by the user.

9. The system of claim 1 wherein the CPU executes the machine-readable instructions to:

receive selection of the print job by the user at an input device of the printer, and receive the identifier value input by the user at the input device of the printer.

10. A non-transitory storage device containing machine-readable instructions that, when executed by a central processing unit (CPU), cause the CPU to:

discover a web-enabled printer based on physical proximity of the printer to a user device;

receive, from a user of the user device, a request for selection of the printer for a print job generate a one-time use uniform resource locator (URL) for the print job, the one-time use URL generated with a universally unique identifier (UUID);

map the UUID to the selected printer;

provide an identifier value for the print job to the user device;

using the one-time use URL, insert the print job into a print queue of the selected printer;

receive as input the identifier value input by the user of the user device;

verify the user-input identifier value; and release the print job for printing based on the identifier value received from the user being successfully verified.

11. The storage device of claim 10 wherein the request for selection of the printer is received after the discovery of the web-enabled printer based on physical proximity of the printer to the user device.

12. The storage device of claim 11 further wherein each of the following are performed after the discovery of the web-enabled printer based on physical proximity of the printer to the user device:

generate the one-time use URL for the print job, map the UUID to the selected printer, provide the identifier value for the requested print job to the user device, insert the print job into the print queue of the selected printer, receive as input the identifier value input by the user of the user device, verify the user-input identifier value, and release the print job for printing.

13. The storage device of claim 10 wherein physical proximity is based on a satellite-based positioning receiver associated with the user device or based on a location provided by the user.

14. The storage device of claim 10 wherein the machine-readable instructions cause the CPU to:

receive a request from the user to discover a web-enabled printer for the print job, transmit a list of discovered printers to the user device, and receive, from the user of the user device, selection of the printer from the list of discovered printers.

15. The storage device of claim 10 wherein the machine-readable instructions cause the CPU to erase the mapping of the UUID to the selected printer upon the print job being released for printing.

16. A method, comprising:

discovering a web-enabled printer based on physical location of a user device, including identifying to a user of the user device discovered printers within a proximity of the user device;

for a print job, receiving a selection of a printer from the discovered printers, including receiving the selection from the user of the user device without informing the user of an email address associated with the selected printer; and in response to discovering the web-enabled printer and receiving the selection of the printer from the discovered printers, further comprising:

generating a one-time use uniform resource locator (URL) for the print job;

providing to the user device an identifier value associated with the selected printer;

using the one-time use URL, transmitting the print job to the selected printer;

receiving as an input the identifier value provided by the user;

verifying the identifier value provided by the user; and releasing the print to the selected printer upon the identifier value being successfully verified.

17. The method of claim 16 further comprising queuing the print job pending release and transmitting the print job to the selected printer upon the identifier value being successfully verified.

18. The method of claim 16 further comprising mapping a universally unique identifier (UUID) to the selected printer and including the UUID in a one time use the one-time use URL used to transmit the print job to the selected printer.

19. The method of claim 18 further comprising erasing said mapping upon releasing the print job.

20. The method of claim 16 further comprising generating the identifier value based on a random number.

* * * * *